United States Patent [19]

Mavel et al.

[11] 4,250,222

[45] Feb. 10, 1981

[54] PROCESS FOR MANUFACTURING FINISHED AND SEMI-FINISHED PRODUCTS FROM MIXTURES OF VARIOUS SYNTHETIC RESIN SCRAP MATERIALS

[75] Inventors: Gerard F. G. Mavel; Emile M. J. Morel, both of Paris; Gabriel M. Richert, Bretigny sur Orge, all of France

[73] Assignee: Institut National de Recherche Chimique Appliquee, Paris, France

[21] Appl. No.: 644,952

[22] Filed: Dec. 29, 1975

[30] Foreign Application Priority Data

Dec. 31, 1974 [FR] France .............................. 74 43507

[51] Int. Cl.$^3$ ........................ C08K 7/02; C08K 7/04; C08K 7/14
[52] U.S. Cl. ................................. 428/285; 260/2.3; 260/6; 260/7.5; 260/8; 260/9; 260/17.4 CL; 260/37 N; 260/37 PC; 260/40 R; 260/42; 260/42.17; 260/42.18; 260/42.43; 260/42.46; 260/42.47; 260/42.49; 260/42.52; 428/286; 428/287
[58] Field of Search ................. 260/2.3, 42.18, 6, 7.5, 260/8, 9, 17.4 CC, 37 N, 37 PC, 40 R, 42, 42.17, 42.43, 42.46, 42.47, 42.49, 42.52; 428/285, 286, 287

[56] References Cited

U.S. PATENT DOCUMENTS 3,654,219  4/1972  Boyer ............................... 260/42.18
3,687,873  8/1972  Kropscott et al. .................... 260/2.3

FOREIGN PATENT DOCUMENTS 2357886  5/1974  Fed. Rep. of Germany .
1246108  10/1960  France .

OTHER PUBLICATIONS

Mod. Plast. Intern, Jun., 1972, p. 10.
Plastiques Mod. Elastom, Nov. 1972, p. 159.
Oleesky, Handbook of Reinforced Plastics, Reinhold Pub. Corp., New York, 1964, pp. 129 & 142.

Primary Examiner—James H. Derrington
Attorney, Agent, or Firm—Scully, Scott, Murphy & Presser

[57] ABSTRACT

A process is disclosed for manufacturing finished and semi-finished articles from mixtures of normally incompatible synthetic resin scrap materials. The process comprises coarsely grinding thermoplastic scrap materials containing two or more mutually incompatible thermoplastic resins and possibly up to 25 parts % by weight of foreign materials, incorporating into the coarsely ground thermoplastic resin mixture through the application of heat, pressure, or a sequential or simultaneous application of heat and pressure, from about 5 to about 25 parts by weight of a fibrous material, the individual fibers in said fibrous material having an average length equal to at least three times the average size of the fragments constituting the coarsely ground thermoplastic resin mixture, and finally, forming the resin/-fiber mass into finished or semi-finished article employing known and conventional techniques.

10 Claims, 1 Drawing Figure

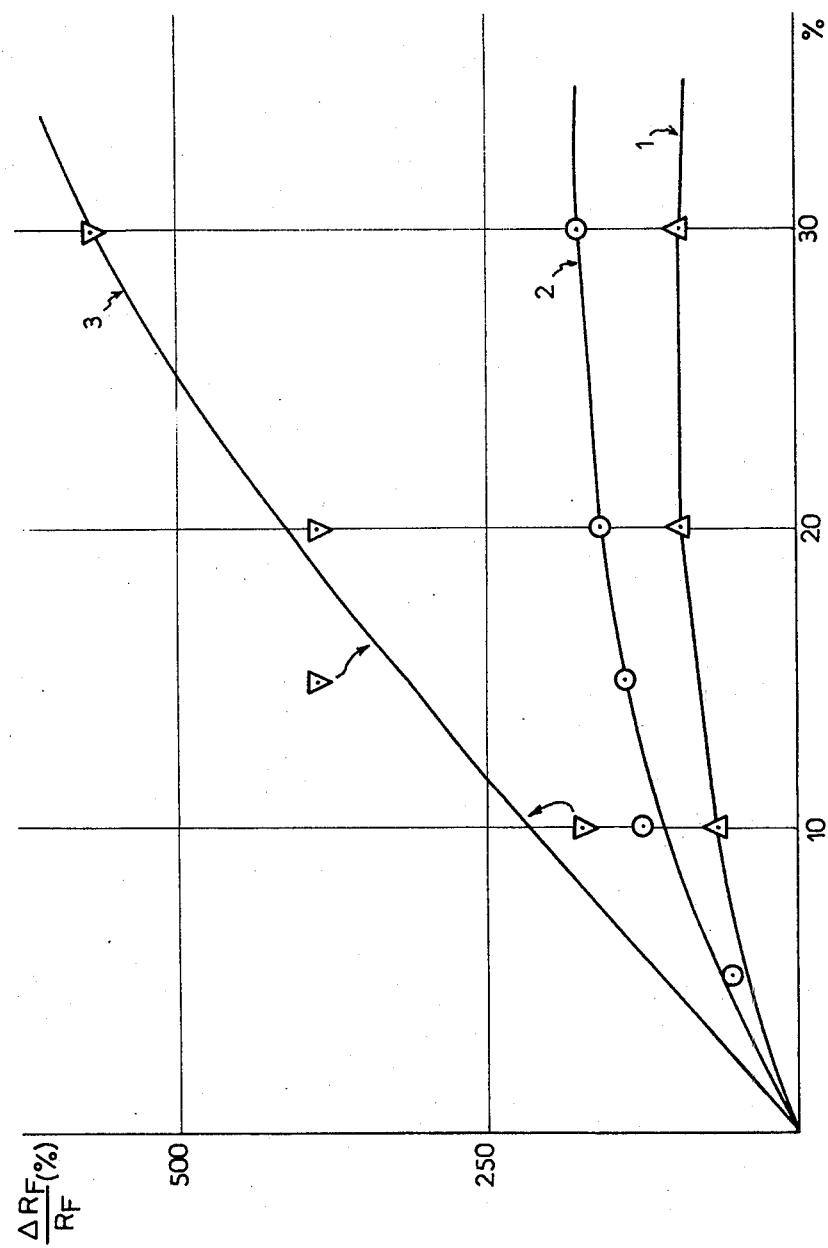

PROCESS FOR MANUFACTURING FINISHED AND SEMI-FINISHED PRODUCTS FROM MIXTURES OF VARIOUS SYNTHETIC RESIN SCRAP MATERIALS

BACKGROUND OF THE INVENTION

1. Field of the Invention

The present invention belongs to the field of processes for the reutilization of thermoplastic resin scrap materials, and more particularly, to such processes employing unsorted quantities of thermoplastic resin scrap materials, which may contain two or more mutually incompatible thermoplastic resins and possibly up to 25% by weight of foreign materials.

2. Description of the Prior Art

The reutilization of individual thermoplastic resins is well known and provides finished and semi-finished articles exhibiting acceptable physical properties. French Pat. No. 1,246,108 discloses a process for converting individual thermoplastic resin scraps and mixtures of compatible thermoplastic resin scraps into placques and films. According to this disclosure, the resin is first subjected to a cleaning operation in which extraneous materials such as caps, labels, etc., are removed therefrom, and thereafter a filter and possibly a reinforcing material such as a metal web or a fibrous material is incorporated into the ground resin under the influence of heat and pressure.

It is at present known, however, that the reutilization of most mixtures of thermoplastic scrap is subject to numerous difficulties when the individual thermoplastic resins contained in the mixtures markedly differ in chemical composition as a result of different values of the cohesive energy density of the various polymers (cf., for example, D. R. Paul, C. E. Vinson and C. E. Locke, "Polym. Eng. Sci.", 12(1972),157). Such resins are said herein to be mutually incompatible (i.e. each resin is insoluble into the other, thus giving rise to a heterogeneous mixture in which each type of resin forms a dispersed phase into the other), the incompatibility manifesting itself in finished and semi-finished articles prepared from mixtures of the resins as mechanical properties (e.g. tensile, flexural and impact strength) become more and more inferior to those demonstrated by articles prepared from the poorest thermoplastic resin in the mixture when cohesive energy densities and more and more different. Incompatibility may occur not only in mixtures of chemically different thermoplastic resins such as polyvinylchloride (PVC) and polystyrene, but may also exist with resins of the same polymeric type, differing however significantly in the nature and quantity of other materials contained in the individual resin formulation. By way of example of this latter type of incompatibility, it has been found that mixtures of different PVCs used in the fabrication of mineral water bottles exhibit physical properties which are significantly inferior to those of the poorest performing PVC in the mixture. The only known example of mixtures of compatible thermoplastic resins wherein the resins contained in the mixture are chemically dissimilar are those made up of polypropylenes, polyethylenes or other polyolefins. However, such mixtures are of limited practical interest owing to their low qualities. They usually do not meet with must products specifications.

Furthermore, the market based on the reutilization of scrap resins for the manufacture of less refined articles, with or without additives, consumes only a small portion of available scrap material (cf., for example, C. W. Marynowski, "Disposal of Polymer Solid Wastes by Primary Polymer Producers and Plastics Fabricators", Report No. PV 213 444 of the Stanford Research Institute, EPA,1972). The practical possibilities of completely sorting mixtures of incompatible resins into groups of like resins is very limited from the technical or economic view. On the contrary, a separate collection of mixtures of thermoplastic resins scraps, which are likely to be incompatible, is of interest under certain conditions as, for example, for large scale manufacturing concerns. It is with such mixtures of incompatible thermoplastic resins that the interest of the process of the present invention arises.

The processes which are at present known for rendering compatible otherwise mutually incompatible thermoplastic resins employ one of the following methods: 1-incorporating so-called "compatibilizing agents" such as rubbers based on copolymers of ethylene and propylene (EPR rubbers) in the case of polyethylene-polypropylene mixtures (cf., R. Longworth and D. L. Funck, J. Appl. Polym. Sci., 10 (1966), 1612; S. Onogi, T. Asada and A. Tenaka, J. Polym, Sci., A-27 (1969), 171; R. E. Robertson and D. R. Paul, J. Appl. Poly. Sci., 17 (1973), 2579), or chlorinated polyethylenes in other cases (French Patent No. 2,111,307 and U.S. Pat. No. 3,687,873; cf., also, D. R. Paul, C. R. Locke and C. E. Vinson, Polymer Eng. Sci., 13 (1973), 202). 2-incorporating into resin mixtures, substantial quantities of more or less inert fillers such as crushed glass, sawdust, paper, etc., with or without the further addition of fibrous materials (cf., for example, Mod. Plast. Intern. June. 1972, p. 10 or Plastiques Mod. Elastom, Nov. 1972, p. 159; German Pat. No. 2,357,886,).

The resin articles obtained following each of the afore mentioned processes are mostly of very mediocre quality except where more or less suitable scraps but of a single type such as polyethylene are used (cf., for example, the so-called Kabor process in which polyethylene scraps, following a manual sorting, are filled with paper to provide materials having relatively satisfactory properties; Mechanical Handling; March 1972; Europlastics Monthly, May 1972). If mixed scrap is used as the starting material, known processes (Regal Convertor of the Plastic Recycling Company Ltd or Reverzer of the Mitsubishi Petrochemical Company) provide materials exhibiting weak mechanical properties at best comparable to those of wood and returning a relatively low price per kilogram. If better properties are sought using known processes, for example, the process referred to above employing EPR rubbers as compatibilizing agents, the cost of the articles becomes prohibitive. On the contrary, it has been observed with well-defined polymers that satisfactory conversion methods are available (cf., for example, Swiss Pat. No. 496,537; Chem. Eng. 78 (1971), No. 13 p. 56; Water and Waste Treatment, Aug. 1973, P. 9; Mod. Plast. Intern., Aug. 1973 p. 54, and Oct. 1973, p. 10), if necessary, by the addition of fresh resin (cf. for example, French Pat. Nos. 2,162,762 and 2,162,763).

Heretofore, no method has been provided for the reutilization of mixtures of mutually incompatible thermoplastic resin scraps which at once results in inexpensive finished or semi-finished articles exhibiting good physical properties.

SUMMARY OF THE INVENTION

The process according to the instant invention for manufacturing finished and semi-finished articles from resin scrap mixtures broadly comprises coarsely grinding a mixture of two or more mutually incompatible thermoplastic resins, incorporating into the coarsely ground thermoplastic resin mixture through the application of heat, pressure or a sequential or simultaneous application of heat and pressure, from about 5 to about 25 parts by weight of a fibrous material, the individual fibers in said fibrous material having an average length equal to at least three times the average size of the fragments constituting the coarsely ground thermoplastic resin mixture, and forming the resin/fiber mass into a finished or semi-finished article.

The resin articles produced in accordance with the process of this invention possess uniformly high physical properties without the need to resort to the use of relatively expensive compatibilizing agents or non-fibrous fillers, though minor quantities of the latter may be used herein where a special property, such as enhanced flame resistance is desired (cf., the use of hydrated alumina particles in the filled polymethyl methacrylate articles disclosed in U.S. Pat. No. 3,827,933). Moreover, it is generally unnecessary to subject the scrap mixtures employed in the process of this invention to a preliminary cleaning operation as the process can tolerate resin mixtures possessing fairly large amounts of foreign materials. However, it is not outside the scope of this invention to wash a given resin mixture before or after grinding if such is considered especially advantageous, e.g. for sanitary care.

DESCRIPTION OF THE PREFERRED EMBODIMENTS

Among the mutually incompatible thermoplastic resin mixtures for use herein, the individual resin components of which differ from each other in chemical structure, are included mixtures of the thermoformable polyesters, polyamides, polycarbonates, polyvinylchlorides, polystyrenes, ABS resins, acrylic resins, acetal resins, polyolefins and so forth. Among the mutually incompatible thermoplastic resin mixtures in which each resin possesses the same polymeric structure but is formulated differently, PVC resins from various sources are especially useful herein due to their ready availability in fairly large quantities.

The expression "coarse grinding" as used herein is generally considered to refer to those resin grindings in which the average fragment size is at least about 1 mm or so, and the maximum fragment size is in the range of about 6 or 7 mm. It is understood that average fragment sizes lying somewhat outside this range can be used herein with entirely acceptable results. In general, reduction in average fragment size will lead to an improvement in mechanical properties of the finished and semi-finished resin materials, all other things being equal. Resins coarsely ground to an average fragment size of from about 1 to 4 mm have been advantageously employed in the process of the instant invention.

The fiber materials for use herein can be virgin or reclaimed fibers and can be selected from mineral fibers such as glass, asbestos, and silica, naturally occuring organic fibers such as cotton, linen, wool and cellulose, and synthetic organic fibers such as esters, polyesters, polyamides and the like. The afore-mentioned fibers can be oiled or sheathed and can be incorporated into the coarsely ground thermoplastic resin mixtures in the form of mats and wovings of varied textures, as textile sheets or strips, as felts or as separate fibers. In order to impart good physical properties to the resin mixtures, it has been found that the average individual fiber length should be at least three times greater than the average fragment size of the resins constituting the mixture. Fiberglass mats of a type currently available wherein the average individual fiber length is in the neighborhood of about 20 cm have been used with excellent results in ground mixtures of incompatible PVC resins passing through sieves of 4 mm mesh.

Progressive improvement in mechanical properties of resin articles prepared in accordance with this invention have been observed as the amount of fibrous material is increased from the minimum quantity of about 5 parts of weight up to about 25 parts by weight. Although greater quantities of fibrous material than this can be added, it is without any appreciable beneficial effect. Optimum mechanical characteristics have been observed at a fiber content level of about 15 to 20 parts % by weight.

Indeed, using the process of the present invention, the fibers impart to the resulting finished or semi-finished thermoplastic resin articles, in addition to mechanical reinforcement owing to their high strength and high modulus, a compatibilizing effect since, for a given transformation treatment, the adherence to fibers of each thermoplastic resin contained in the mixture is much greater than that of the resins to each other. As a matter of fact the common fibrous substrate provides an anchoring effect to the different phases of the otherwise non compatible resins. This yields a much greater effect of relative reinforcement when fibers are incorporated into a mixture of incompatible resins than into any single one of them.

This is illustrated by the accompanying Figure showing the relative increase of the flexural strengths (in %) vs the percentage of glass fibers added. In this figure, curve (1) is that of polyolefin scraps, curve (2) is that of PVC scraps and curve (3) that of a mixture (50/50) of polyolefin and PVC scraps.

The techniques of incorporating fibrous mats, webs and individual fibers into resin matrices under the influence of heat, pressure, or a combination of the two are well known to those skilled in the art. It is within the scope of the present invention to introduce the ground scrap upon one or both surfaces of the fibrous mats, sheets, strips, individual fibers, etc. For example, the ground scrap can be applied to one surface of the fibrous material, the opposite surface of the fibrous material being arranged to receive another thermosetting resin which has not been reclaimed, or a bitumen, cement, concrete and the like. The resin mixture containing the fibrous material is then passed through a heating tunnel which has been adjusted to a suitable temperature, whereupon the mixture is softened, and thereafter the mass is subjected to any one of such well known and conventional forming operations as cold-stamping, calendering, compression molding, etc., to provide finished or semi-finished resin materials. When mats are used as described in the following examples, a satisfactory isotropy and homogeneity of the mechanical characteristics of the products are observed in the plane of the mats.

Any of the known and conventional non-fibrous fillers used in plastics manufacturing can be used herein. However, since it is not necessary to add such fillers to acquire a compatibilized resin article, it is generally preferred to omit the inclusion of fillers thereby keeping the manufacturing cost of the resin article as low as possible. If, on the other hand, the addition of relatively minor amounts, e.g., up to 20% by weight of a filler or other substance is desired in order to impart additional properties (such as rot or flame resistance), it may be incorporated into the coarsely ground resin mixture together with the fibers. Active and inert fillers such as fly-ash and gaz-blowing agents have been successfully incorporated into the resin articles produced in accordance with the instant invention for the purpose of reducing the density of the articles.

The process of the present invention offers several advantages over processes heretofore known for reutilizing thermoplastic scrap. From an economic point of view, a considerable advantage of the invention herein lies in its ability to use unsorted, unclassified thermoplastic scrap which, at present, sells for approximately 16 to 24 times less per kilogram than the most common virgin thermoplastic resins, and up to 4 times less per kilogram than sorted, classified thermoplastic resin scrap. From a mechanical point of view, finished and semi-finished resin materials manufactured in accordance with the process of this invention possess, as will be demonstrated hereinafter, mechanical properties which are superior to those of unfilled virgin resins and yet at a cost which is significantly less than that for the latter.

The following examples are given by way of illustration and in no way limit the invention.

EXAMPLE 1

Without removing the labels and polyethylene caps, polyethylchloride bottles (P.V.C.) for the Contrexeville, Vittel and Evian (denoted below as C, V and E) brands of mineral water were ground separately, passed through a 4 mm screen and then mixed.

Table I below gives the results of mechanical tests carried out in separate and mixed grinds, with and without the addition according to the invention of glass mat with continuous fibers of 375 g/cm$^2$ of the "UNIFILO" (Saint Gobain Industries; Textile Glass) type. The flexural strengths measured in hbar ($R_F$), the flexural moduli measured in hbar ($E_F$), the heat deflection temperature under load measured in °C. under 18.5 kg/cm$^2$ (HDT), are shown. In this example as well as in all the examples which follow, the proportion of fibers is between 15 and 20% by weight.

TABLE I

| Resin Sample | Composition | Unreinforced material | | | Reinforced material | | |
|---|---|---|---|---|---|---|---|
| | | $R_F$ | $E_F$ | HDT | $R_F$ | $E_F$ | HDT |
| 1 | V, 100% | 6.2 | 260 | 59.5 | 9.8 | 370 | 75 |
| 2 | E, 100% | 5.6 | 270 | 64 | 11.3 | 460 | 68 |
| 3 | C, 100% | 4.4 | 270 | 58.5 | 9.5 | 450 | 68 |
| 4 | V, 33% E, 33% C, 33% | 3.9 | 270 | 60 | 7.1 | 390 | 71 |

EXAMPLE 2

To PVC sample No. 4 of Example I, various percentages of thermoplastic scrap of different types were added: Polyethylene-PE detergent (bottles), polystyrene-PS (washed yogurt containers).

Table II below sets forth the results of mechanical tests carried out without and with the addition of the identical fiberglass mat. In addition to the measurements effected above, determinations of impact strength on an un-notched specimen in dJ/cm$^2$, denoted $R_C$, (DYNSTAT test), were made.

TABLE II

| Resin Sample | Composition | Unreinforced material | | | | Reinforced material | | | |
|---|---|---|---|---|---|---|---|---|---|
| | | $R_F$ | $E_F$ | HDT | $R_C$ | $R_F$ | $E_F$ | HDT | $R_C$ |
| 4 | V, 33%; E, 33%; C, 33% | 3.9 | 270 | 60 | 2.4 | 7.1 | 390 | 71 | 56 |
| 5 | 50% Sample 4 + 50% PE | 0.8 | 260 | 36 | 13 | 3.9 | 180 | 80.5 | 41 |
| 6 | 75% Sample 4 + 25% PS | 2.8 | 240 | 60 | 2.7 | 6.2 | 350 | 89 | 42 |
| 7 | 50% Sample 4 + 50% PS | 2.2 | 210 | 68 | 3.4 | 8.1 | 370 | 93 | 63 |
| 8 | 25% Sample 4 + 75% PS | 3.0 | 220 | 78.5 | 6.1 | 8.1 | 390 | 93 | 65 |
| 9 | 90% Sample 4 + 5% PE + 5% PS | 2.6 | 180 | 55 | 3.0 | 8.2 | 410 | 75.5 | 63 |
| 10 | 40% Sample 4 + 40% PE + 20% PS | 0.6 | 50 | 42 | 5.9 | 3.6 | 170 | 97 | 39 |
| 11 | 33% Sample 4 + 33% PE + 33% PS | 1.0 | 70 | 45 | 4.8 | 4.0 | 180 | 95 | 34.5 |

EXAMPLE 3

Polyethylene-PE (bottles) and polystyrene-PS (washed yogurt containers) were ground separately, passed through a 4 mm screen and then mixed.

Table III below sets forth the results of the mechanical tests carried out without and with the addition of the identical fiberglass mat.

TABLE III

| Resin Sample | Composition | Unreinforced material | | | Reinforced material | | |
|---|---|---|---|---|---|---|---|
| | | $R_F$ | $E_F$ | HDT | $R_F$ | $E_F$ | HDT |
| 12 | PE, 100% | 1.0 | 29 | 37 | 3.2 | 130 | 88 |
| 13 | PS, 100% | 3.6 | 215 | 89 | 8.7 | 390 | 96 |
| 14 | 60% PE + 50% PS | 1.4 | 99 | 44.5 | 3.7 | 180 | 97 |

By way of comparison, Table IV below sets forth the results of the mechanical tests made under the same conditions on virgin polymers: Kwert 60 (Plastimer) rigid PVC: TON (Ugine-Kulhmann) pearl crystal PS; and low density PE.

TABLE IV

| | | Unreinforced material | | | | Reinforced material | | | |
|---|---|---|---|---|---|---|---|---|---|
| Resin Sample | Composition | $R_F$ | $E_F$ | HDT | $R_C$ | $R_F$ | $E_F$ | HDT | $R_C$ |
| 15 | PVC, 100% | 8.9 | 300 | 66 | 20 | 12.2 | 490 | 76.5 | 56 |
| 16 | PS, 100% | 5.3 | 325 | 74 | 3.5 | 10.0 | 590 | 87 | 47 |
| 17 | PE, 100% | 1.3 | 30 | 29 | 30 | 2.9 | 160 | 79 | 89 |

These results show that the physical properties of resin products manufactured from reinforced scrap in accordance with the method of the present invention are comparable to those demonstrated by the best of unreinforced virgin materials, and this at a substantially reduced cost price. Materials such as those described above therefore lend themselves to end uses of interest of various industries, particularly in the form of composites, the reinforcing material being covered with thermoplastic scrap on a single surface, the other, due to the fibrous structure, being capable of holding any other suitable material (polyester resin, bitumen, cement, concrete, etc.). Moreover, the resin material obtained can undergo any suitable finishing treatment (coating, paint, metallization, etc.) well known to those skilled in the art. By way of non-limiting illustration, may be mentioned the following applications: building materials (shingles, external facings, wall coverings, floor and roof coverings, synthetic flooring and fencings for stock raising, etc.); packaging (pallets, etc.); furniture and sanitary equipment; chemical engineering (tanks and cisterns, etc.) and civil engineering (gutters, pipes, etc.)

What is claimed is:

1. A process for compatibilizing mixed mutually incompatible thermoplastic synthetic resins which comprises:
    (a) coarsely grinding a mixture of mutually incompatible thermoplastic resin scraps;
    (b) incorporating into the coarsely ground mixture of incompatible thermoplastic resin scraps through the application of heat and pressure
        (i) from 5 to about 25 parts % by weight of a fibrous material, the individual fibers in said fibrous material having an average length equal to at least three times the average size of the fragments constituting the coarsely ground thermoplastic resin mixture, and when special characteristics are sought,
        (ii) from 0 to about 20 parts % by weight of a non fibrous convenient additive, and
    (c) forming the resin/fiber mass into finished or semi-finished articles.

2. The process of claim 1 in which each of the mutually incompatible thermoplastic scrap resins is a chemically different polymer.

3. The process of claim 1 in which each of the mutually incompatible thermoplastic scrap resins is a chemically identical polymer but differs in the nature and quantity of other materials originally contained in the resin formulation.

4. The process of claim 3 in which each of the mutually incompatible thermoplastic scrap resins is a polyvinylchloride based resin.

5. The process of claim 1 in which the mixture of incompatible thermoplastic resin scraps is ground to an average fragment size in the range of from about 1 mm to about 4 mm.

6. The process of claim 1 in which the fibrous material is a mat, sheet, strip or individual fiber of glass, asbestos, silica, cotton, linen, wool, cellulose, polyester or polyamide.

7. The process of claim 6 in which about 15 to 20 parts % by weight of a fibrous material comprising a glass mat wherein the average length of the individual glass fibers in said mat is greater than 50 mm is incorporated into a coarsely ground mixture of incompatible thermoplastic resin scraps passing through a 4 mm screen.

8. The process of claim 1 in which the mutually incompatible thermoplastic synthetic resins contain up to 25 parts % by weight of extraneous materials.

9. The process of claim 8 in which the extraneous materials are removed from the mutually incompatible thermoplastic synthetic resins prior to the grinding step (a).

10. A thermoplastic resin article produced by the process of claim 1.